United States Patent [19]

Matsumura

[11] Patent Number: 4,787,734
[45] Date of Patent: Nov. 29, 1988

[54] STEREOSCOPIC MICROSCOPE

[75] Inventor: Isao Matsumura, Yokosuka, Japan

[73] Assignee: Canon Kabushiki Kaisha, Tokyo, Japan

[21] Appl. No.: 881,382

[22] Filed: Jul. 2, 1986

[30] Foreign Application Priority Data

Jul. 11, 1985 [JP] Japan .................. 60-153002

[51] Int. Cl.⁴ .................. A61B 3/10; G02B 21/22; G01B 9/00
[52] U.S. Cl. .................. 351/212; 356/124; 350/516
[58] Field of Search .................. 351/211, 212, 247; 350/423, 515, 516, 519, 525; 354/400, 402; 128/303.1; 356/124; 358/93

[56] References Cited

U.S. PATENT DOCUMENTS

| | | |
|---|---|---|
| 4,157,859 | 6/1979 | Terry. |
| 4,477,167 | 10/1984 | Ishikawa et al. .......... 354/400 |
| 4,594,608 | 6/1986 | Hatge et al. .......... 358/93 |
| 4,597,648 | 7/1986 | Feldon et al. .......... 351/212 |
| 4,657,356 | 4/1987 | Matsumura .......... 350/516 |

FOREIGN PATENT DOCUMENTS 3228609 2/1983 Fed. Rep. of Germany.
3531134 3/1986 Fed. Rep. of Germany.

Primary Examiner—Rodney B. Bovernick
Assistant Examiner—Jay Ryan
Attorney, Agent, or Firm—Fitzpatrick, Cella, Harper & Scinto

[57] ABSTRACT

A stereoscopic microscope including a stereoscopic optical system for observing an object under examination, an index projected on the object, a light-receiving unit for receiving an image of the index reflected by the object, an image variable magnification unit for changing the size of the reflected image on the light-receiving unit, a variable magnification detection unit for detecting the magnification set by the image variable magnification unit, and an operation unit for calculating a curved shape of the object from data from the detection unit and data from the light-receiving unit.

12 Claims, 2 Drawing Sheets

STEREOSCOPIC MICROSCOPE

BACKGROUND OF THE INVENTION

1. Field of the Invention

The present invention relates to a stereoscopic microscope mainly used for ophthalmological treatment and, more particularly, to a stereoscopic microscope having a function for correcting a variation in the measured value which results from a change in magnification.

2. Related Background Art

Stereoscopic microscopes are used in a wide range of applications such as medical examination and surgery, for research and industrial purposes, and the like. Since a stereoscopic microscope allows stereoscopic observation, it increases precision and safety during surgery or the like. For example, when the disease of an eye, constituting a precise optical system, is to be treated, the stereoscopic microscope is used to perform an adequate treatment for restoring its function.

When an eyeball is subjected to surgery, its original shape and function must be restored after the surgery. Particularly, as for cataract surgery is increasingly performed, an important factor in determining the success of the operation is how the corneal shape is restored. For this reason, it is very effective to add a corneal-shape measuring function to the surgical stereoscopic microscope, and to measure and display the corneal shape before, during, and after the operation.

A surgical stereoscopic microscope must allow observation and measurement with precision, and requires different magnifications in accordance with the different purposes of the surgery. Therefore, stereoscopic microscopes having a variable magnification optical system, such as a zoom/variable magnification function, are often used.

In keratoplasty, the size of a ring-like portion of the cornea cannot be measured because of the presence of stitches. In this case, in order to avoid such an unmeasurable portion, projection magnification of an index on the cornea must be changed in order to change the size of the index for corneal-shape measurement. Such alteration of the index projection magnification must be performed as needed in treatments other than keratoplasty, in order to measure the corneal shape.

In the variable magnification system, however, the measured value of the corneal shape varies naturally. When the measured value varies during measurement of a single object, it leads to cumbersome processing in analyzing the measured value.

SUMMARY OF THE INVENTION

It is an object of the present invention to provide a stereoscopic microscope which corrects a variation in a measured value resulting from a change in a variable magnification optical system when the measurement optical system comprises a variable magnification optical system.

It is another object of the present invention to provide a stereoscopic microscope which allows stereoscopic observation of a curved object to be tested and which arithmetically operates the curved shape of the object to be examined.

BRIEF DESCRIPTION OF THE DRAWINGS

The accompanying drawings show a stereoscopic microscope according to embodiments of the present invention, in which.

DETAILED DESCRIPTION OF THE PREFERRED EMBODIMENTS

Figure 1:
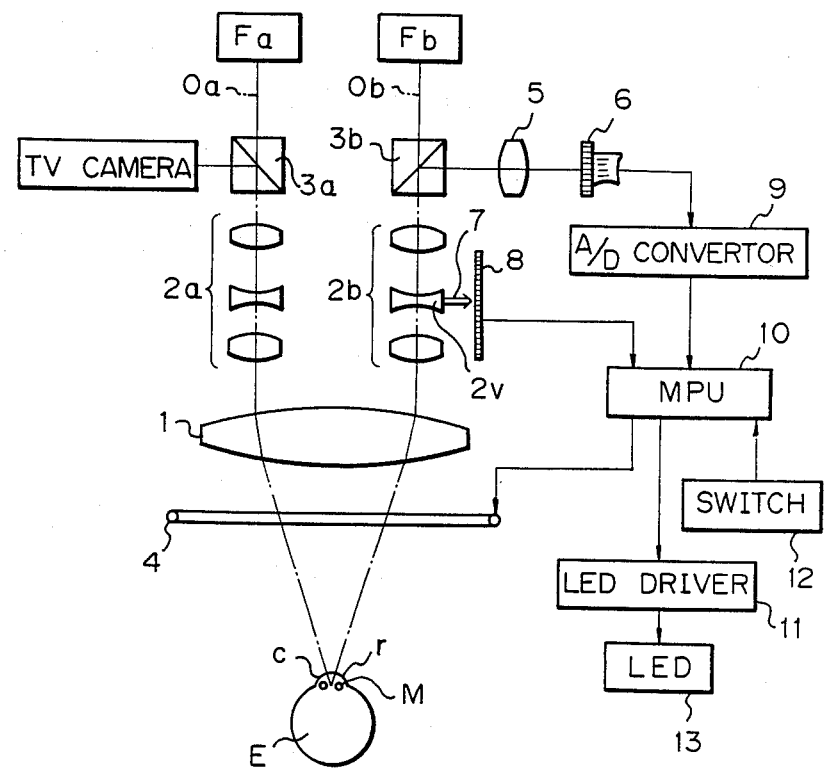
FIG. 1 is a block diagram showing the configuration of the first embodiment.

FIG. 1 is a block diagram of an optical system and a surgical system, and shows an embodiment of the present invention applied to a surgical microscope for corneal-shape measurement, through which an eye E to be examined is observed. The eye E can be stereoscopically observed by an ophthalmologist through a common objective lens 1 arranged in front of the eye E, zoom/variable magnification systems 2a and 2b, beam splitters 3a and 3b, and finder optical systems Fa and Fb, which are aligned on optical systems 0a and 0b, respectively. A ring-like light source 4 is provided between the eye E and the objective lens 1 as part of the corneal-shape measurement optical system. A focusing lens 5 and a light-receiving element surface 6, such as a two-dimensional CCD, are arranged on an optical path passing through the objective lens 1 and the zoom/variable magnification system 2b, and on the opposite side of the beam splitter 3b. A pointer 7 is connected as a variable magnification detecting means to a variater 2v inside the zoom/variable magnification system 2b. An encoder 8 is arranged at a position to detect the pointer 7. The light-receiving element surface 6 is connected to a microprocessor unit (to be referred to as an MPU hereinafter) 10 via an A/D converter 9. The encoder 8, the ring-like light source 4, an LED driver 11, and a measurement switch 12 are also connected to the MPU 10 to be parallel with each other. An LED 13 is connected to the LED driver 11.

In the embodiment of the present invention with the above arrangement, part of the beam reflected by the eye E is incident on the zoom/variable magnification system 2a as an afocal beam by the objective lens 1.

Part of the incident beam is split by the beam splitter 3a and used for photographing with a TV camera or for allowing observation with a lateral scope. The remaining part of the beam reaches the eye of the ophthalmologist through the finder optical system Fa and is observed. Similarly, the beam incident on the zoom/variable magnification system 2b via the objective lens 1 reaches the ophthalmologist through the beam splitter 3b and the finder optical system Fb, to form a stereoscopic image together with the incident beam passed through the finder optical system Fa.

Meanwhile, the beam from the ring-like light source 4 is reflected by a cornea C of the eye E, and forms a so-called Mayer image M as a ring-like reflected cornea image. The Mayer image M is laterally reflected by the beam splitter 3b through the objective lens 1 and the zoom/variable magnification system 2b, and is projected on the light-receiving element surface 6 by the focusing lens 5, so that the shape of the cornea C (e.g., its radius of curvature r) can be measured. Part of the Mayer image M is observed by the ophthalmologist through the finder optical system Fb.

The selected magnification of the zoom/variable magnification system 2b is detected by reading the position of the pointer 7, which is connected to the variater 2v, through the encoder 8. The corneal-shape measurement and projection magnification correction are started by depressing the measurement switch 12 after completion of the alignment of the entire apparatus. First, the MPU 10 starts operation to turn on the ring-like light source 4. The analog signal from the projected image of the Mayer image M formed on the light-receiving element surface 6 is converted into a digital signal by the A/D converter 9, and the digital signal is supplied to the MPU 10. Meanwhile, a signal representing the magnification, which is read by the encoder 8 as the position of the pointer 7 connected to the variater 2v, is also supplied to the MPU 10. The signal from the light-receiving element surface 6 is operated in the MPU 10 by the signal supplied from the encoder 8 in order to correct the projection magnification. The operation result is displayed on the LED 13 through the LED driver 11 as the data representing the corneal shape.

In this manner, according to this embodiment, the projection magnification of the Mayer image M onto the light-receiving element surface 6 is corrected. The measured value does not vary depending on the projection magnification, so that a measured value such as the radius, of curvature r of the cornea C can be obtained with good precision.

Figure 2:
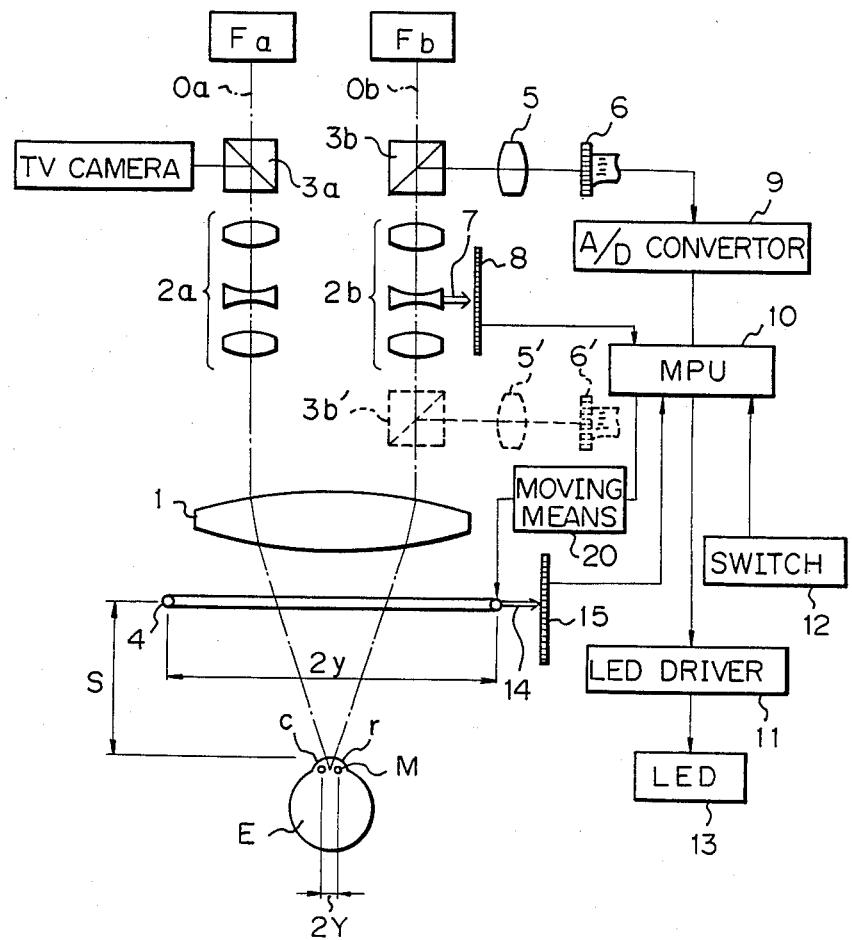
FIG. 2 is a block diagram showing the configuration of the second embodiment.

FIG. 2 is a block diagram of the second embodiment of the present invention. In the second embodiment, correction of a projection magnification of a ring-like light source 4 onto a cornea C is performed together with correction of a projection magnification of a Mayer image M onto a light-receiving element surface 6, using the zoom/variable magnification system $2b$ shown in the first embodiment.

More specifically, sometimes the shape of part of the cornea C is changed according to the type of surgery, and some portion of the cornea C cannot be subjected to measurement such as its radius of curvature r. In this case, the projection magnification of the ring-like light source 4 to the cornea C must be changed in order to enable measurement of the shapes of respective portions of the cornea C, ranging from its central portion to its peripheral portion, thus eliminating any unmeasureable portion.

Consideration will now be made on the influence of the position of the ring-like light source 4 with respect to the radius of curvature r of the cornea C. Assume that the diameter of the ring-like light source 4 is 2y, the diameter of the Mayer image M is 2Y, the distance between the ring-like light source 4 and the cornea C is S, and the radius of curvature of the cornea C is r. In accordance with Newtonian focus, the following equation is established:

$$Y/y = f/Z$$

where Z is the distance between the ring-like light source 4 and a focal point f of the cornea C.

Since the radius of curvature of the cornea C is r, $f = r/2$ and $Z = S + r/2$.

Therefore, $Y/y = (r/2)/(S + r/2)$, which can be rewritten as $(r/2) \cdot \{(y/Y) - 1\} = S$.

Thus, $r = 2S \cdot Y/(y - Y)$ is obtained. Since the radius y of the ring-like light source 4 is constant, the radius of curvature r of the cornea C is a function of the radius Y of the Mayer image M and the distance S between the ring-like light source 4 and the cornea C.

In the second embodiment, the distance S is variable. Therefore, the distance S and the radius Y of the Mayer image M must be measured. More particularly, the second embodiment comprises the observation optical system for the eye E, the corneal-shape measurement optical system, and the correction optical system for the projection magnification of the Mayer image M onto the light-receiving element surface 6, in the same manner as the first embodiment, and additionally comprises a means for detecting the change in the distance S so as to correct the projection magnification of the Mayer image M onto the cornea C.

In FIG. 2, the same reference numerals from reference numerals 1 to 13 denote the same members as in the first embodiment shown in FIG. 1. In addition, a pointer 14 is connected to the ring-like light source 4 moved by a moving means 20. An encoder 15 is provided to detect the pointer 14. The output of the encoder 15 is connected to the MPU 10.

More specifically, in measurement of the corneal shape of different portions such as the central or peripheral portions of a cornea C, when a magnification correction is performed by changing the distance S between the ring-like light source 4 and the cornea C, a correction value is obtained from the position of the pointer 14 provided on the ring-like light source 4, with respect to the encoder 15. The data from the encoder 15 is supplied to the MPU 10, and is processed therein together with the data supplied from the encoder 8 to the MPU 10 for correction of the projection magnification of the Mayer image M onto the light-receiving element surface 6, and the data on the Mayer image M supplied from the light-receiving element surface 6. As a result, exact data needed for qualitative and quantitative analysis of the corneal shape before, during, and after ophthalmological surgery can be immediately displayed on the LED 13.

The variable magnification optical system is not limited to the zoom system described in the above embodiments, but the magnification can be changed by lens exchange. In this case, separate magnification identifying means may be provided to the individual lenses.

When the ring-like light source 4 is moved along its optical axis, a variable magnification optical system, such as the zoom/variable magnification $2b$, need not always be used as an optical system serving as both an observation optical system and a measurement optical system, but a stationary optical system (fixed magnification) may be used instead. In this case, the beam splitter $3b$ can be provided at a position $3b'$ between the zoom lens $2b$ and the objective lens 1, so that the beam is split thereat.

In the embodiments described above, the measurement optical system serves as the stereoscopic observation optical system. However, a separate variable magnification or fixed magnification measurement optical system may be provided.

In the embodiments described above, a ring-like index was used as the index. However, the index need not be a complete ring. A plurality (e.g., two) of spot-like light sources can be provided and turned on to allow measurement along a single radial direction. Alternatively, more than two light sources can be provided and operation can be performed to obtain the same result as with the ring-like index.

As described above, the stereoscopic microscope according to the present invention has a correction means for projection magnification of the reflected image of the test object, as the index, onto a light-receiving element surface. Therefore, measurement can be performed correctly even if the observation magnification is arbitrarily changed in accordance with the portion to be observed. In addition, if required, a correction means can be provided for projection magnification of the index projected onto the test object, and the projection portion of the index can be changed as needed. Therefore, the object under examination can be observed from various angles during observation or surgery. In addition, since the correction means can correct the measured value quickly, a correct measured value can be obtained regardless of the change in the magnification. As a result, during surgery or the like, the shape of the object can be correctly confirmed to ensure the accuracy of the surgery. After surgery, the state of the operated area can be observed correctly, thereby allowing safe and accurate treatment of the object.

In the above description, the cornea C was the object under examination. However, the object is not limited to the cornea C but can be any object which forms a reflected image by a light source. In addition, the present invention is applicable not only to the medical field including surgery, but also to various research and industrial fields.

I claim:

1. A stereoscopic microscope comprising:
   a stereoscopic optical system for observing a curved object under examination;
   means for projecting a light beam onto the object;
   light-receiving means for indicating the position of an image of the light beam reflected by the object;
   image variable magnification means for changing a size of the reflected image on said light-receiving means;
   variable magnification detection means which indicates the position of said image variable magnification means for detecting the magnification selected by said image variable magnification means; and
   operation means which receives data from said detection means and said light receiving means for calculating a curved shape of the object.

2. A stereoscopic microscope according to claim 1, wherein the projected light beam is a ring-shaped light beam.

3. A stereoscopic microscope according to claim 1, wherein said image variable magnification means comprises means for moving said projecting means along its optical axis.

4. A stereoscopic microscope according to claim 3, wherein said variable magnification detection means comprises an encoder for detecting a position of said projecting means along its optical axis.

5. A stereoscopic microscope according to claim 1, wherein said image variable magnification means comprises a variable magnification optical system provided between the object and said light-receiving means.

6. A stereoscopic microscope according to claim 5, wherein said variable magnification optical system is provided midway along one optical path of said stereoscopic optical system.

7. A stereoscopic microscope according to claim 6, wherein a beam splitter is provided behind said variable magnification optical system, and said light-receiving means is provided in an optical path of light split by said beam splitter.

8. A stereoscopic microscope according to claim 6, wherein a beam splitter is provided in front of said variable magnification optical system, and said light-receiving means is provided in an optical path of light split by said beam splitter.

9. A stereoscopic microscope according to claim 4, wherein said variable magnification optical system comprises a zoom lens.

10. A stereoscopic microscope according to claim 5, wherein said variable magnification detection means comprises an encoder for detecting a position of said variable magnification optical system along its optical axis.

11. A stereoscopic microscope according to claim 1, wherein said image variable magnification means comprises means for moving said projecting means along its optical axis and variable magnification optical means provided between the object and said light-receiving means.

12. A stereoscopic microscope according to claim 1, wherein said stereoscopic optical system comprises an objective lens opposing an eye to be examined, and right and left ophthalmological optical systems having optical axes parallel to each other are provided behind said objective lens.

* * * * *

UNITED STATES PATENT AND TRADEMARK OFFICE
CERTIFICATE OF CORRECTION

PATENT NO.  : 4,787,734
DATED       : November 29, 1988
INVENTOR(S) : Matsumura

It is certified that error appears in the above-identified patent and that said Letters Patent is hereby corrected as shown below:

AT [56] References Cited

"Hatge et al." should read --Hatae, et al.--.

COLUMN 2

Line 47, "lateral scope" should read --lateralscope--.

Signed and Sealed this

Twenty-ninth Day of August, 1989

Attest:

DONALD J. QUIGG

Attesting Officer

Commissioner of Patents and Trademarks